United States Patent Office 3,431,122
Patented Mar. 4, 1969

3,431,122
INK COMPOSITIONS FOR MARKING FOOD PRODUCTS
Clarence W. Wilson, Ontario, Calif., assignor to Sunkist Growers, Inc., Los Angeles, Calif., a corporation of California
No Drawing. Continuation of application Ser. No. 290,228, June 24, 1963. This application July 12, 1967, Ser. No. 652,985
U.S. Cl. 106—22        7 Claims
Int. Cl. C09d 11/00

ABSTRACT OF THE DISCLOSURE

The present invention relates to a substantially water-resistant ink for marking food products consisting essentially of a water-soluble triphenylmethane derivative dye and a solvent consisting essentially of a mixture of glycerol monooleate and glycerol dioleate as well as the process of marking food products with such ink.

BACKGROUND OF INVENTION

This application is a continuation of applicant's co-pending application, Ser. No. 290,228, filed June 24, 1963, now abandoned.

The present invention is directed to an ink composition and a process of using this ink composition. More particularly, the present invention is directed to an ink which may be used to mark food products, e.g., fruits and vegetables, and the process of marking food products with this ink.

It is, of course, highly desirable to prevent any risk that those who eat food which has been marked with an ink will be detrimentally affected by the ink. Thus, in general, it is highly desirable that the dyes or coloring materials which are used to mark food products be certified by the appropriate authorities for use in foods, drugs and cosmetics. In the United States, such colors are broadly referred to as F, D & C colors.

One of the primary difficulties in preparing an ink which is suitable for marking foods is that of finding a solvent which has suitable solvent characteristics, but which will not permit substantial bleeding of the ink when wet. For example, F, D & C Blue #1, F, D & C Green #1 and F, D & C Violet #1 are soluble in water and ethanol, but these solvents will not prevent bleeding, smearing and washing away of the dyes when they come into contact with water. On the other hand, these dyes are substantially insoluble in the non-volatile animal and vegetable oils and in the liquid fatty acids of which oleic acid is an illustration. Furthermore, these dyes tend to be less soluble in alcohols as the molecular weight of the alcohols increases. Surprisingly, it has been found that these dyes are soluble in certain mixtures of organic esters.

In addition, it is desirable that the colors used to mark food products have a substantial resistance to being smeared or removed by washing. In fact, it is particularly desirable that the inks used be capable of effectively marking wet food products since it is often most convenient to mark these products after they have been washed and are still wet. Resistance to smudging under combinations of temperature and humidity that can cause condensation of moisture is also desirable.

Furthermore, in order to have commercial suitability, the ink should not be subject to oxidation nor thickening by volatilization of the solvent while standing for prolonged periods exposed to the atmosphere on a stamp pad, cloth, ribbon or as a thin layer on an inking plate or roller.

Although many different types of inks have been tested for use in marking food products, none have yet been developed which possess the optimum combination of safety, permanence and resistance to oxidation and volatilization discussed above.

Thus, it is a primary object of the present invention to provide an ink for marking food products and the process of applying this ink to food products.

It is another object of the present invention to provide an ink for marking food products which will not have a detrimental effect on those who eat the food so marked and the process of marking food products with this ink.

It is a further object of the present invention to provide an ink for marking food products which ink is substantially resistant to water and capable of marking wet food products and the process for marking food products with this ink.

It is still another object of the present invention to provide an ink for marking food products which is substantially resistant to oxidation and the process of using this ink to mark food products.

It is still another object of the present invention to provide an ink for marking food products which is substantially resistant to loss of solvent by volatilization and the process of using this ink to mark food products.

Other objects and advantages of the present invention, it is believed, will be apparent from the following detailed description thereof.

Briefly, the ink of the present invention comprises certain water soluble dyes dissolved in a solvent which is not miscible with water. More particularly, the ink of the present invention comprises certain certified food colors dissolved in organic solvents. In the preferred embodiment of this invention, mixtures of mono and di-glycerol esters of fatty acids, e.g., oleic acid, are used in such proportions that the mixtures are liquid at the temperature of operation. Certain mixtures of these and similar esters are better solvents for particular colors than are others and are preferably used accordingly. Given the concept of the present invention, only routine experimentation is required to determine which solvent is most suitable for a certain dye.

Broadly, colors which are water soluble triphenylmethane derivatives may be used in the present invention. Particularly suitable are F, D & C Blue #1 and F, D & C Violet #1 and F, D & C Green #1. In general, suitable dyes are metal, usually alkali metals, salts of triphenylmethane sulfonic acids.

The following specific examples are illustrative of the process and composition of the present invention, but it is to be understood that the invention is not to be limited to the specific details thereof. All parts are by weight in these examples.

Example 1

25 grams of F, D & C Violet #1 was dissolved in 75 grams of a mixture of 56 parts of glycerol monooleate and 44 parts of glycerol dioleate by grinding. This solution was then coated on a cloth ribbon of the type that is used in cash registers. The ribbon was used as a pad to ink a rubber die which in turn was used to stamp potatoes which were thoroughly wet by immersion in a detergent solution followed by rinsing with water. The resulting impression was clear and the color did not significantly bleed into the water on the potato surface.

For the purpose of comparison, a similar composition in which water was substituted for the organic solvent was prepared. This composition made almost no impression on the potato and practically all of the dye appeared in the water film covering the potato.

For further comparison, a commercial ink comprising an oleic acid solution of an oil soluble color transferred almost no color to the wet potato and the ink remained preferentially on the die.

Example 2

An ink was prepared as in Example 1 using 20 parts by weight of F, D & C Blue #1 and 80 parts of a mixture comprising 56 parts of glycerol monooleate and 44 parts of glycerol dioleate. A cloth ribbon was coated with this blue ink in substantially the same manner as in Example 1 and was used to ink a die which in turn was used to stamp lemons which had been waxed and were ready for shipment.

A green impression resulted from the optical combination of the blue dye overlying the yellow lemon rind. The impression was clear and was not as readily smudged as an impression made using a commercial ink comprising an oleic acid solution of an oil soluble blue dye.

Example 3

A quantity of oranges were stamped in the same manner as the lemons in Example 2 using the ink of Example 1. The resulting impression was clear, bright and satisfactory in all respects.

It will be readily apparent to those skilled in the art that these specific embodiments may be modified in various ways without departing from the scope of the present invention. In general, the ratio of monoester to diester in the solvent may be in the range of from 5:5 to 6:4. Glycerol monooleate and glycerol dioleate are solids at room temperature, but certain mixtures of these esters are liquid at room temperature. Thus, the ratio of esters used to prepare the solvent used in the present invention should be such that a liquid mixture is obtained and, in addition, should be such that an effective solvent for the dye to be used is obtained. When using F, D & C Blue #1, F, D & C Violet #1 and F, D & C Green #1 as the dyes in the ink of the present invention, it is preferred to use a mixture of oleate esters of glycerol. However, esters of other similar fatty acids may be used.

Although the inks of the present invention have been described herein as solutions, it is to be understood that it is possible that these inks may possible be colloidal dispersions which have substantially no tendency to separate. Thus, the present invention is not to be considered limited to any particular theory with regard to the interaction of the dye and the organic carrier or solvent.

In the foregoing I have referred to esters in terms that are familiar to the technology of fats and to those skilled in the art. For clarification, the designations mono and di in all cases refer to the number, that is one or two respectively, of molecules of the fatty acid combined with one molecule of glycerol. Those skilled in the art refer to these as mono and diglycerides, whereas chemists may refer to them as, for example, glycerol monooleate and glycerol dioleate respectively.

What is claimed is:
1. A substantially water-resistant liquid ink for marking food products consisting essentially of a water-soluble triphenylmethane derivative dye and a solvent consisting essentially of a mixture of glycerol monooleate and glycerol dioleate.
2. A substantially water-resistant liquid ink for marking food products consisting essentially of a dye comprising a water-soluble metal salt of a triphenylmethane sulfonic acid and a solvent consisting essentially of a mixture of glycerol monooleate and glycerol dioleate.
3. A substantially water-resistant liquid ink for marking food products consisting essentially of a dye comprising a water-soluble metal salt of a triphenylmethane sulfonic acid and a solvent consisting essentially of a mixture of glycerol monooleate and glycerol dioleate, the ratio of said monooleate to said dioleate being in the range of from about 6:4 to about 5:5.
4. A substantially water-resistant liquid ink for marking food products consisting essentially of a dye selected from the group consisting of F, D & C Blue #1, F, D & C Violet #1 and F, D & C Green #1; and a solvent consisting essentially of a mixture of glycerol monooleate and glycerol dioleate.
5. The ink of claim 7 wherein the dye is F, D & C Blue #1.
6. The ink of claim 7 wherein the dye is F, D & C Violet #1.
7. The ink of claim 4 wherein the dye is F, D & C Green #1.

References Cited

UNITED STATES PATENTS

| | | | |
|---|---|---|---|
| 2,435,222 | 2/1948 | Kline | 106—243 XR |
| 2,821,821 | 2/1958 | Yen | 106—22 |
| 2,843,497 | 7/1958 | Stuckey et al. | 106—287 |
| 2,853,422 | 9/1958 | Jarrett | 167—85 |
| 2,876,162 | 3/1959 | Lauffer | 167—90 |
| 3,192,057 | 6/1965 | Hines et al. | 99—168 |
| 3,011,899 | 12/1961 | Morgan | 106—19 |

OTHER REFERENCES

Benton, Charles H.: Acetoglycerides in Cosmetics, in American Perfumer and Cosmetics, vol. 78, No. 10, pp. 37–40. October 1963. (Copy in Group 120, Class 167, sub class 85.)

JULIUS FROME, *Primary Examiner.*

J. B. EVANS, *Assistant Examiner.*

U.S. Cl. X.R.

106—28